United States Patent [19]

Nickeas et al.

[11] Patent Number: 5,992,191
[45] Date of Patent: Nov. 30, 1999

[54] ANTI-THEFT DEVICE FOR MOTOR VEHICLES

[76] Inventors: Mark Nickeas, 32369 Lake Pleasant Dr., Westlake Village, Calif. 91361; Martin Nickeas, 2155 Jamestown Way, Oxnard, Calif. 91305; Pasco C. Ponticelli, Jr., 2051 Via Veneto, Camarillo, Calif. 93010

[21] Appl. No.: 09/056,203

[22] Filed: Apr. 6, 1998

[51] Int. Cl.⁶ .................................................. B60R 25/02
[52] U.S. Cl. ................................ 70/218; 70/221; 70/188; 74/492
[58] Field of Search ............................. 70/188, 189, 218, 70/220, 221, 222, 223, 224, 237, 472, 149, 422; 74/492, 483 K; 180/287

[56] References Cited

U.S. PATENT DOCUMENTS

| | | | |
|---|---|---|---|
| 1,368,382 | 2/1921 | Becker | 70/218 |
| 1,421,870 | 7/1922 | Diezelski | 70/219 |
| 1,556,588 | 10/1925 | Christoph | 70/223 |
| 4,881,389 | 11/1989 | Alfon et al. | 70/216 |
| 5,150,592 | 9/1992 | Lin | 70/218 |
| 5,180,029 | 1/1993 | Rosenlund | 70/186 |
| 5,345,797 | 9/1994 | Hayes | 70/218 |
| 5,383,344 | 1/1995 | Zambell | 70/218 |
| 5,735,151 | 4/1998 | Nickeas et al. | 70/218 |
| 5,823,024 | 10/1998 | Goodson et al. | 70/218 |

*Primary Examiner*—Suzzanne Dino Barrell
*Attorney, Agent, or Firm*—Lyon & Lyon LLP

[57] ABSTRACT

An anti-theft device for motor vehicles which selectively disables the vehicle by interrupting the operative connection of the steering wheel to the steering column. The device includes an outer cylindrical boss which is affixed to the steering wheel and an inner cylindrical boss which is affixed to the steering column. The outer boss is disposed about the inner boss and axially movable thereon with the steering wheel between an engaged position and a disengaged position. In the engaged position the inner boss is coupled to the outer boss by a plurality of engaged locking teeth for operation of the vehicle. In the disengaged position locking teeth on the outer boss are axially separated from locking teeth on the inner boss and the outer boss and attached steering wheel are freely rotatable about the inner boss, operatively disengaging the steering wheel from the steering column and effectively disabling the vehicle. A locking assembly employing a key actuated cam and associated spring biased latch provides a dual coupling of the outer boss to the inner boss to securely lock the steering wheel in either the engaged position or the disengaged position.

17 Claims, 12 Drawing Sheets

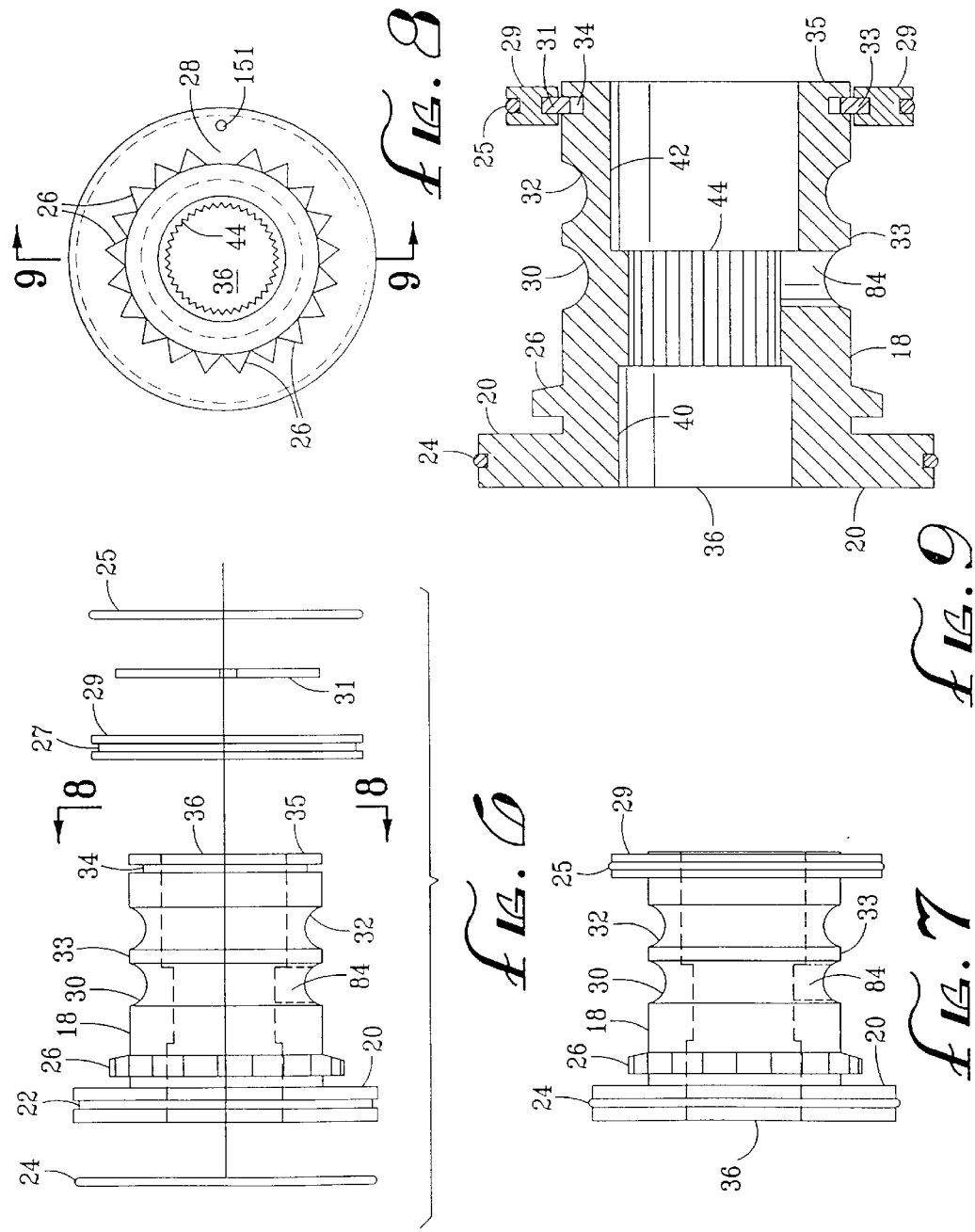

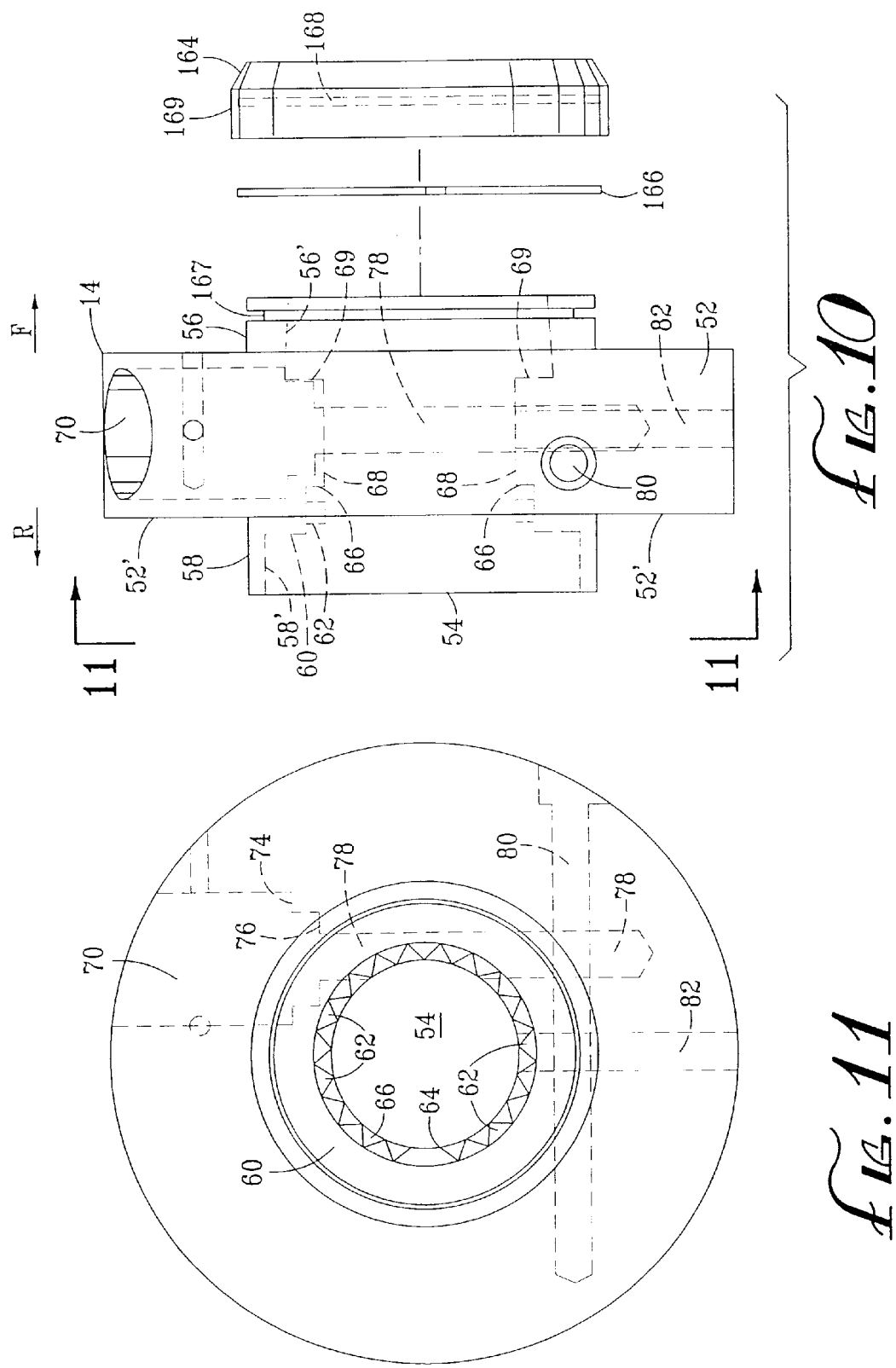

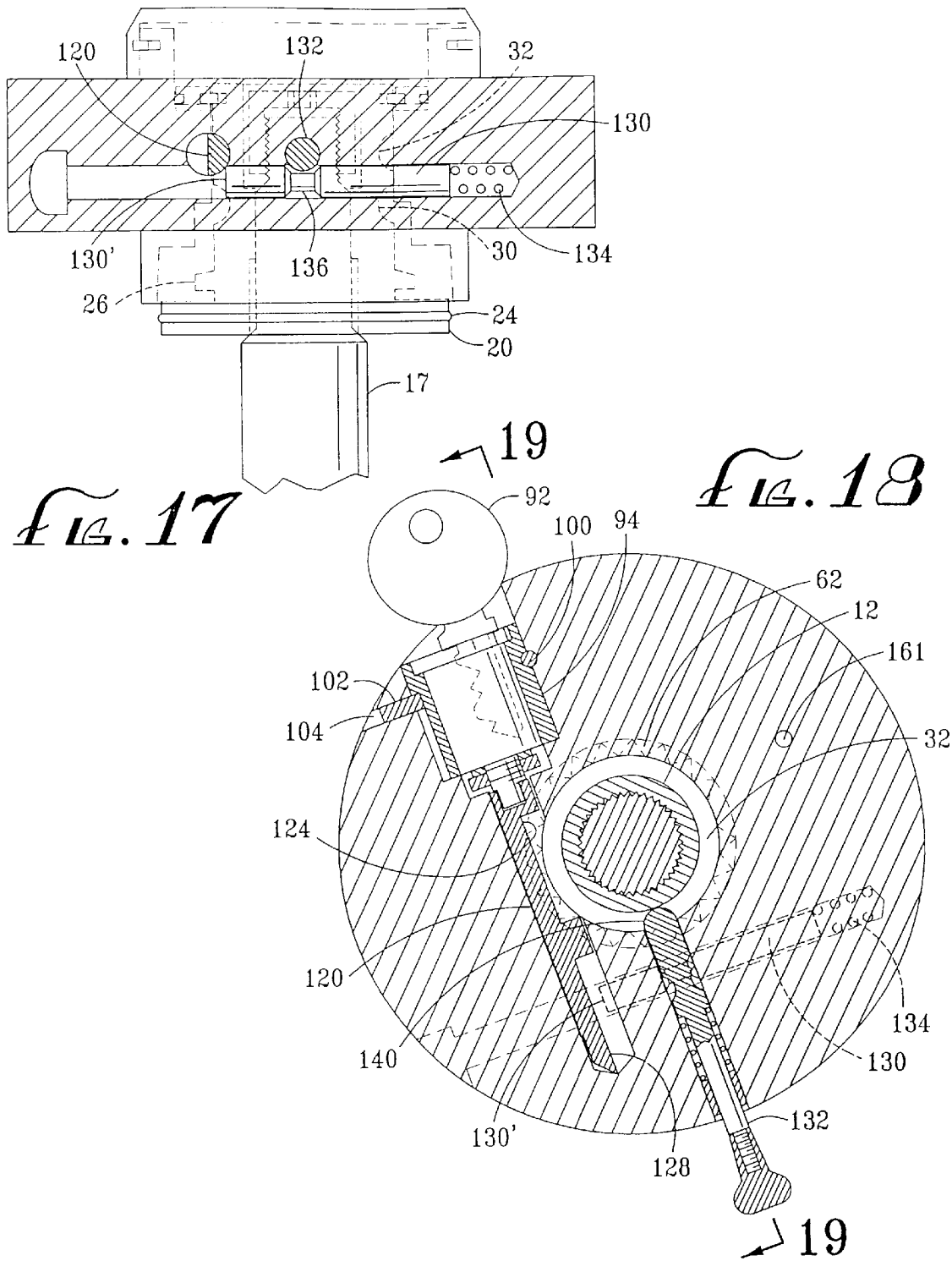

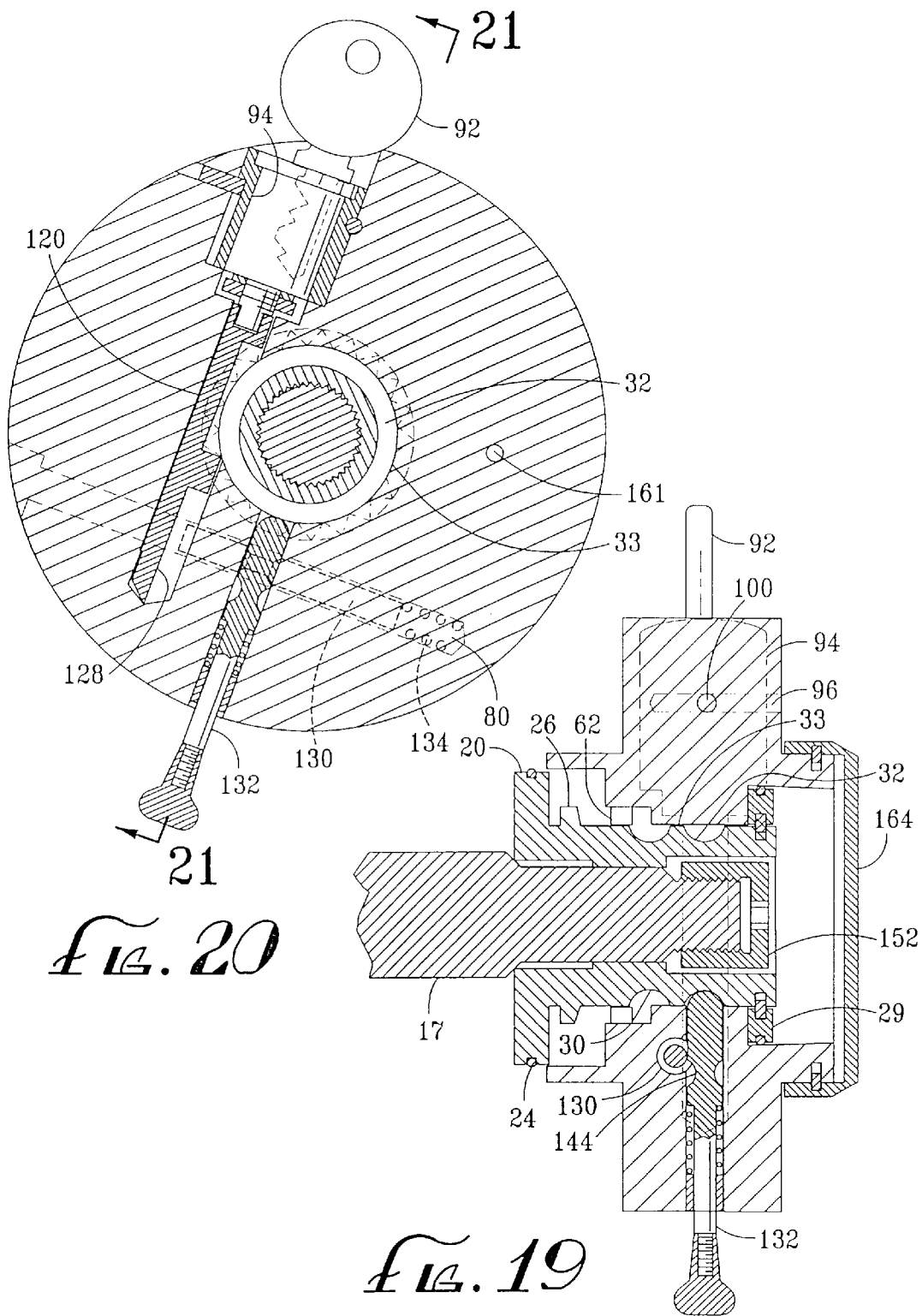

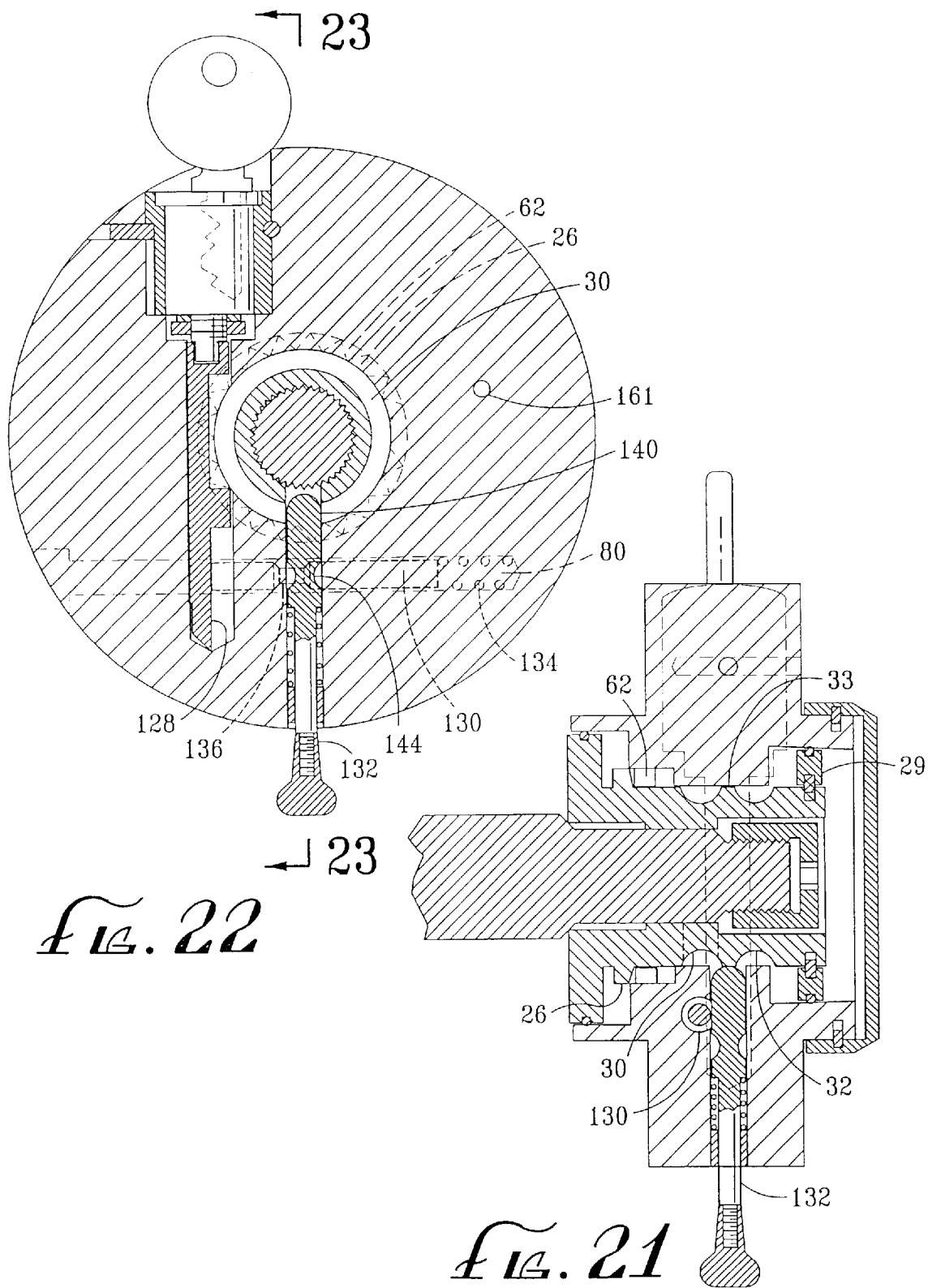

ANTI-THEFT DEVICE FOR MOTOR VEHICLES

BACKGROUND OF THE INVENTION

In recent years, numerous different kinds of anti-theft devices have been developed to render automobiles more difficult to steal. Such devices range from very costly alarm systems equipped with a variety of sophisticated mechanisms for disabling the vehicle to the far less expensive steering wheel locking devices. The ease with which most such devices can be overcome or circumvented, however, has lead to the increasing popularity of automobile recovery devices employing radio transmitters despite their substantial costs and failure to prevent the theft in the first instance.

An automobile protection device should prevent the initial theft of the vehicle, preferably by disabling the vehicle as opposed to merely sounding an alarm. Auto alarms are often ignored and can generally be rather easily deactivated. Those which are more difficult to silence are generally too costly for most car owners and again are frequently ignored due to the frequency of false alarms. An anti-theft device should not only disable the vehicle when activated and be difficult to circumvent but also should be relatively inexpensive to manufacture and install so that most drivers could afford to equip their vehicles with such a device. The anti-theft device of the present invention possesses these attributes.

The automobile anti-theft devices which have been previously developed to provide such protection at a low cost typically employ a form of locking mechanism which disables the vehicle by preventing rotation of the steering wheel when the device is in the locked position. When faced with such devices, a thief will generally break the lock or cut through the steering wheel, depending on the nature of the device, and thereby circumvent the disabling mechanism. Unfortunately, this is usually a relatively simple task even for unsophisticated thieves and both easier and faster than attempting to "pick" the locking mechanism. While a variety of sophisticated yet relatively inexpensive locking mechanisms have been developed which are exceedingly difficult to open without the proper key or combination, the anti-theft devices employing such mechanisms can still be overcome by the appropriate application of a force sufficient to break the locking mechanism. If such devices were as difficult to break as they are to "pick," they would indeed provide excellent protection against automobile theft at a reasonable cost.

An improvement in vehicle anti-theft devices is found in applicant's U.S. Pat. No. 5,735,151, issued Apr. 7, 1998 and entitled ANTI-THEFT DEVICE FOR MOTOR VEHICLES. The device disclosed therein comprises a locking mechanism carried by and between the vehicle's steering wheel and steering column for selectively engaging and releasing the operative connection of the steering wheel to the steering column. The mechanism includes an outer cylindrical boss which is permanently affixed to the steering wheel and an inner cylindrical boss which is affixed to the extended end of the vehicle's steering column and rotatably disposed within the outer boss such that the outer boss and attached steering wheel are freely rotatable on and about the inner boss. A tamper-proof securement retains the inner boss within the outer boss to prevent unauthorized removal of the steering wheel from the steering column. A locking mechanism which is both tamper-proof and key actuated is provided in the outer boss which, in the locked position, physically couples the outer boss to the inner boss and thus operatively connects the steering wheel to the steering column for controlling the vehicle. In the unlocked position, the coupling of the outer boss to the inner boss provided by the locking mechanism is released, leaving the steering wheel and outer boss attached to but free-wheeling on the inner boss, thus rendering the vehicle uncontrollable by means of the steering wheel and effectively inoperative.

The above-described device represented an improvement over the prior art anti-theft devices. However, if one were to ignore instructions to the contrary and leave the key in the lock during operation of the vehicle, the steering wheel could be disengaged during operation of the vehicle by turning the key to the unlocked position. While such conduct would certainly be reckless, the present invention protects the vehicle's occupants from such an occurrence. In addition, the locking mechanism of the present invention provides a redundant locking mechanism to prevent disengagement of the steering wheel from the steering column in the unlikely event of a failure in the locking bar of the prior mechanism. As a result, the mechanism of the present invention retains the beneficial anti-theft features of the previously developed mechanism while substantially enhancing the locking mechanism therein.

SUMMARY OF THE INVENTION

Briefly, the automotive anti-theft device of the present invention comprises a locking assembly carried by and disposed between the vehicle's steering wheel and steering column for selectively engaging and releasing the operative connection of the steering wheel to the steering column. The device includes an outer cylindrical boss which is rigidly affixed to the steering wheel and an inner cylindrical boss which is rigidly affixed to the extended end of the vehicle's steering column. The outer boss is disposed about the inner boss and axially movable thereon with the steering wheel between a forward engaged position and a rearward disengaged position. In the engaged position, the inner boss is physically coupled to the outer boss by a plurality of engaged locking teeth such that any rotational movement of the steering wheel is imparted to the steering column for normal operation of the vehicle. In the disengaged position, the locking teeth on the outer boss are axially separated from the teeth on the inner boss, whereupon the outer boss and attached steering wheel are freely rotatable on and about the inner boss, effectively disabling the vehicle. A tamper-proof locking assembly employing a key actuated cam and an associated spring biased latch provides a dual coupling of the outer boss to the inner boss to prevent axial movement of the outer boss on the inner boss to securely lock the steering wheel in either the engaged position or the disengaged position. To prevent the steering wheel from being moved to the disengaged position during operation of the vehicle by the turning of a key, the locking assembly of the present invention allows the steering wheel to be disengaged only by the coordinated operation of the cam and latch locking mechanisms.

It is the principal object of the present invention to provide an improved anti-theft device for motor vehicles which effectively disables the vehicle in a manner which can not be readily overcome or circumvented by a car thief.

It is another object of the present invention to provide an improved anti-theft device for automobiles which disables the vehicle in a manner which can not be overcome or circumvented by the use of excessive force.

It is yet another object of the present invention to provide a highly effective anti-theft device for vehicles which is of relatively simple construction and economical to manufacture and install.

It is a further object of the present invention to provide a highly effective anti-theft device for vehicles which can be provided on a vehicle as original equipment by the automobile manufacturers or readily added to a vehicle as an aftermarket product.

It is a still further object of the present invention to provide a highly effective anti-theft device for vehicles which is both easy to use and highly resistant to mechanical failure.

These and other objects and advantages of the present invention will become readily apparent from the following detailed description taken in conjunction with the accompanying drawings.

BRIEF DESCRIPTION OF THE DRAWINGS

FIG. 6 is an exploded side view of the inner boss and associated securement ring, locking ring and o-rings.

FIG. 7 is an assembled side view of the inner boss and associated securement ring, locking ring and o-rings.

FIG. 8 is a frontal view of the inner boss as seen from line 8—8 in FIG. 6.

FIG. 9 is a sectional view taken along the line 9—9 in FIG. 8.

FIG. 10 is an exploded side view of the outer boss, locking ring and securement cover with the interior channels, grooves and chambers being illustrated in dotted lines.

FIG. 11 is a rear view of the outer boss as seen from line 11—11 in FIG. 10.

FIG. 17 is a sectional view taken along the line 17—17 in FIG. 16.

FIG. 18 is a sectional frontal view of the anti-theft device of the present invention shown in the disengaged position, unlocked and ready for re-engagement.

FIG. 19 is a sectional view taken along the line 19—19 in FIG. 18.

FIG. 20 is a sectional frontal view of the anti-theft device of the present invention illustrating the re-engagement of the outer boss to the inner boss as the user applies pressure to the steering wheel while turning the wheel to mate together the engaging teeth.

FIG. 21 is a sectional view taken along the line 21—21 in FIG. 20.

FIG. 22 is a sectional frontal view of the anti-theft device of the present invention in the engaged position prior to locking the devce with the key.

FIG. 24 is a sectional frontal view of the key pin employed in the locking assembly of the present invention.

FIG. 25 is a side view of the key pin employed in the locking assembly of the present invention.

FIG. 26 is a side view of the plunger rod employed in the locking assembly of the present invention.

FIG. 27 is a partial sectional view of the safety pin employed in the locking assembly of the present invention.

FIG. 28 is a perspective view of the locking sleeve employed in the locking assembly of the present invention.

FIG. 29 is a perspective view of the threaded fastening member employed in the securement of the inner boss of the anti-theft device of the present invention to the steering column.

DESCRIPTION OF THE PREFERRED EMBODIMENT

Figure 3:
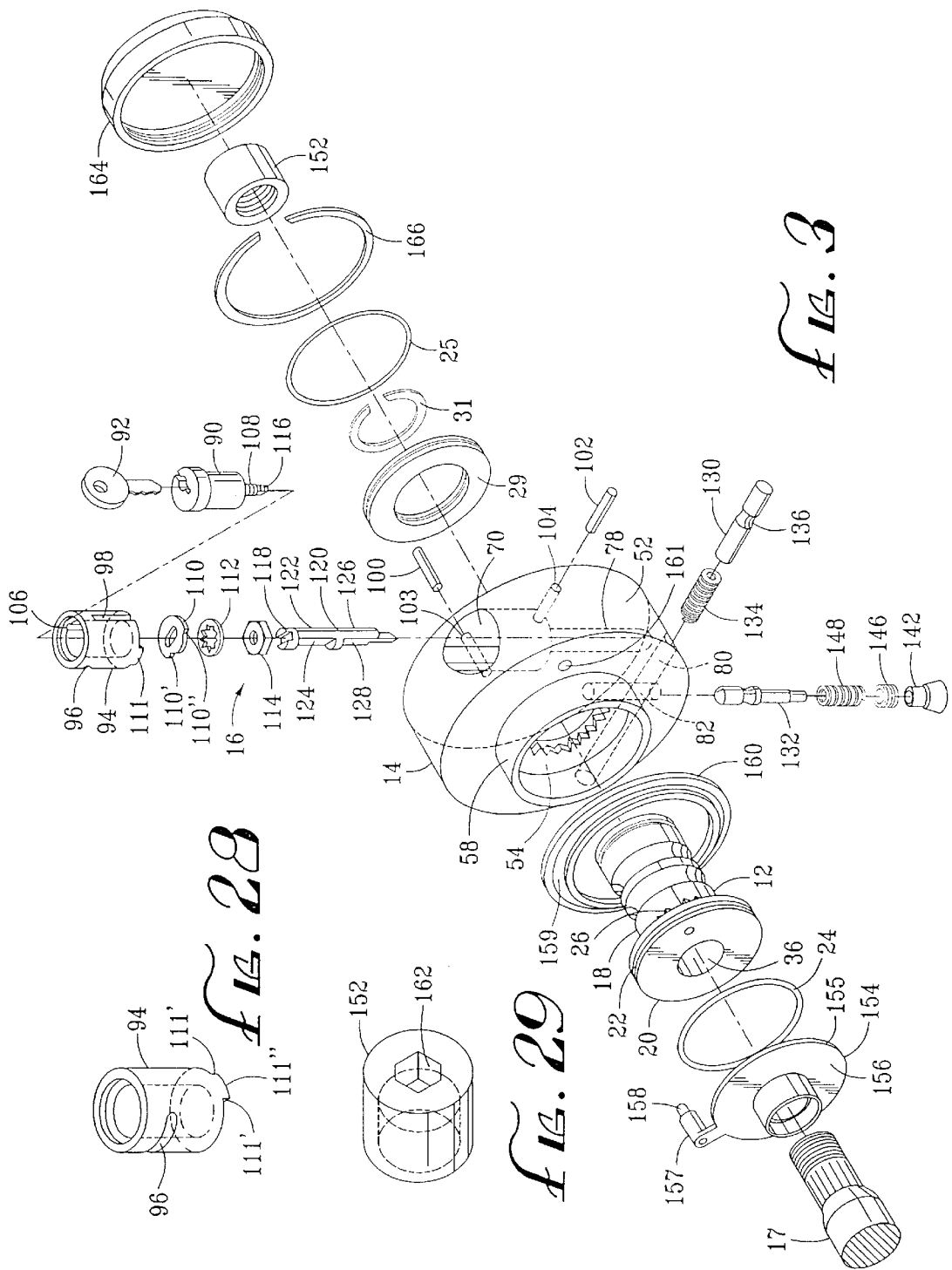
FIG. 3 is an exploded perspective view of the anti-theft device of the present invention illustrating the components thereof.
Figure 4:
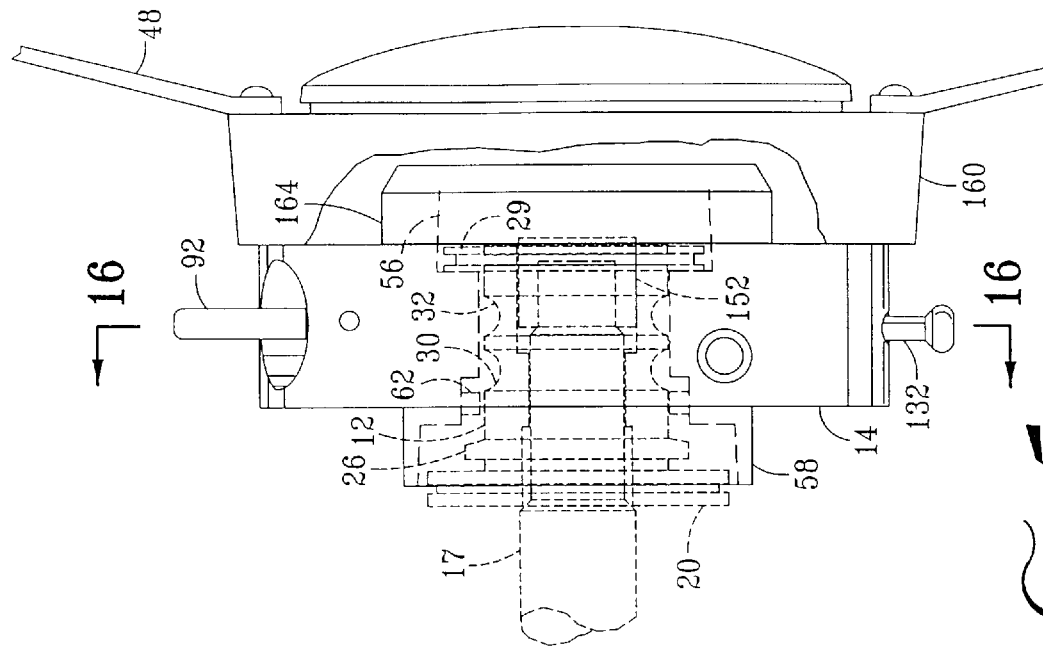
FIG. 4 is a side view of the anti-theft device of the present invention with the steering wheel in the engaged position and with a portion of the steering wheel adaptor broken away and interior components illustrated in dotted lines.
Figure 5:
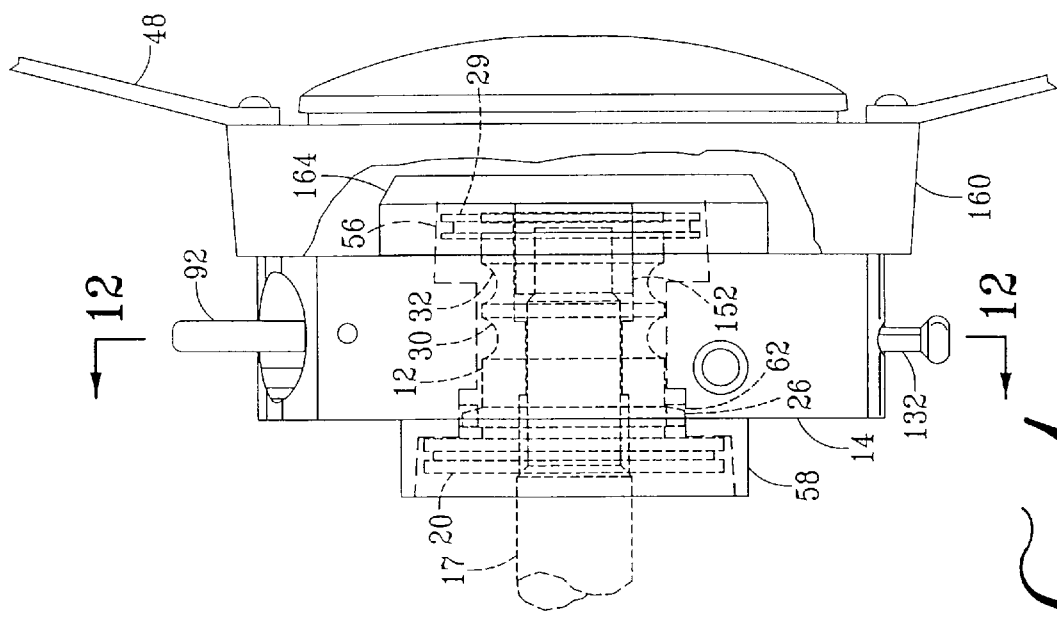
FIG. 5 is a side view of the anti-theft device of the present invntion with the steering wheel in the disengaged position and with a portion of the steering wheel adaptor broken away and interior components illustrated in dotted lines.

Referring now in detail to the drawings, the anti-theft device 10 of the present invention comprises a substantially cylindrical inner boss 12, a cylindrical outer boss 14 and a locking assembly 16 carried in the outer boss 14. As seen in FIG. 3, the inner boss 12 is adapted to be mounted on and secured to the steering column 17 of the vehicle. Inner boss 12 is preferably constructed of high strength steel and, as seen in FIGS. 6–9, includes a substantially cylindrical body portion 18 terminating at its rearward end in an annular radial flange 20 (as used herein, the "rearward" end or side of a component is disposed away from the driver of the vehicle and the "forward" end or side is disposed toward the driver). Flange 20 defines an annular recess 22 in the perimeter portion thereof adapted to receive a conventional o-ring 24. Spaced forwardly of flange 20 are a plurality of radially projecting locking teeth 26. The locking teeth 26 extend circumferentially about body portion 18 proximate flange 20 and define a guide gap 28 therein between a pair of teeth 26 as seen in FIG. 8. Spaced forwardly of locking teeth 28 are a pair of annular channels 30 and 32 which are curvilinear in cross section and separated by a ridge 33. A groove 34 is disposed in the body portion 18 of inner boss 12 proximate the forward end 35 thereof. Boss 12 has a cylindrical bore 36 extending therethrough adapted to receive the extended end portion 38 of the steering column 17. Bore 36 defines smooth wall portions 40 and 42 which are separated by a plurality of inwardly projecting and axially extending splines 44. Splines 44 are adapted to mate with a splined portion 46 of the steering column 17 as will be later described.

Figure 1:
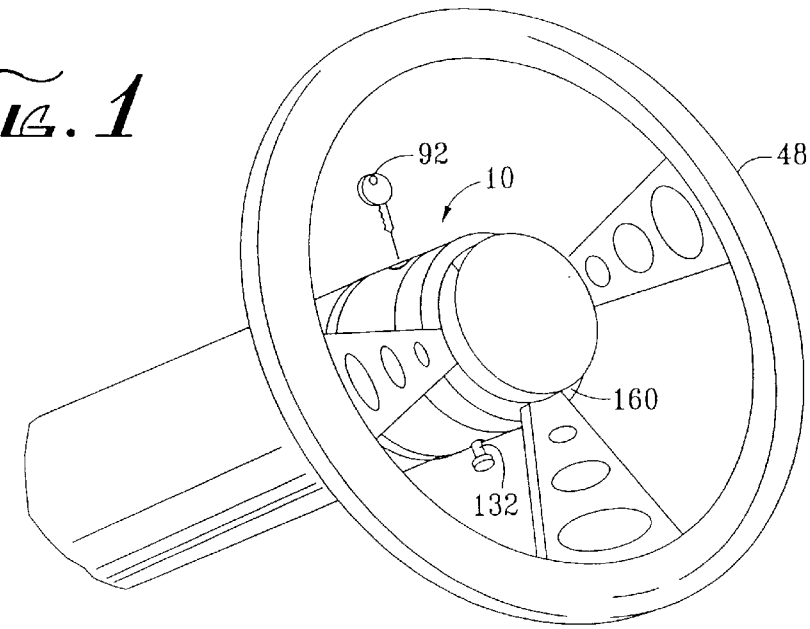
FIG. 1 is a perspective view of a steering wheel assembly equipped with the anti-theft device of the present invention.
Figure 2:
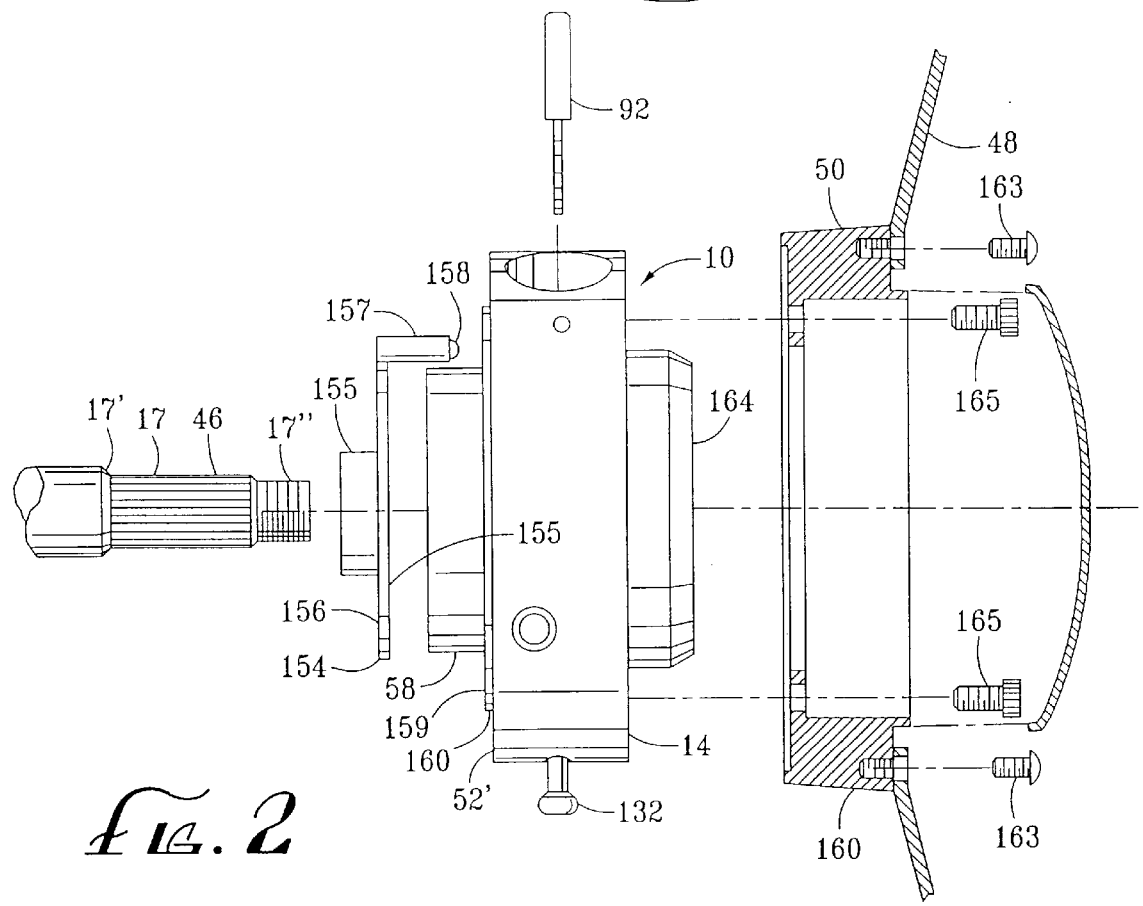
FIG. 2 is a partially sectioned exploded side view of the anti-theft device of the present invention, including portions of the steering column and steering wheel.

The outer boss 14 is also constructed of high strength steel and is adapted to be secured to the steering wheel 48 by means of an adapter 50 as seen in FIG. 2. As seen in FIGS. 10 and 11, the outer boss 14 comprises a cylindrical body portion 52 having an axial bore 54 extending therethrough which is adapted to receive the inner boss 12. A first annular flange 56 projects forwardly (toward the driver of the vehicle) from body portion 52 about the forward end of bore 54 and a second annular flange 58 projects rearwardly from body portion 52 about the rearward end of bore 54. Bore 54 defines an annular rearwardly facing wall 60 interiorly of and perpendicular to rearwardly projecting flange 58. Wall 60 is disposed slightly rearwardly of the rear surface 52' of the body portion 52 of outer boss 14. Spaced forwardly of wall 60 are a plurality of radially projecting locking teeth 62. Teeth 62 are adapted to mate with the locking teeth 26 on the inner boss 12 for engagement of the outer boss to the inner boss. Disposed in arcuate alignment with locking teeth 62 is a guide key 64 which is adapted to project into the guide gap 28 between a pair of locking teeth 26 so as to radially align the inner boss with the outer boss for reasons which will become readily apparent. Spaced forwardly of locking teeth 62 in bore 54 is an annular rearwardly facing wall 66 terminating in a constant diameter centrally disposed portion 68 of axial bore 54. The constant diameter portion 68 of the bore terminates at its rearward end in the forwardly facing annular wall 69.

The cylindrical body portion 52 of the outer boss defines a chamber 70 for housing the locking cylinder 71. Chamber 70 projects inwardly from the outer surface of body portion 52 and defines at its inner end a first annular stop 74, a second annular stop 76 and an elongated channel 78 as seen in FIG. 11. A second elongated channel 80 is disposed in the cylindrical body portion 52 at right angles with respect to channel 78 and intersects channel 78 proximate the extended closed end of channel 78. A third elongated channel 82 extends parallel to channel 78, passing through channel 80 and communicating with the axial bore 54 of the outer boss in the constant diameter portion 68 thereof. Upon inserting the outer boss 14 about inner boss 12 such that the locking teeth 62 carried the outer boss are engaged with the locking teeth 26 on the inner boss and the guide key 64 on the outer boss projects into the gap 28 in locking teeth 26, channel 82 in outer boss 14 is aligned with a cylindrical channel 84 extending radially through the body portion 18 of inner boss 12. Channel 84 is axially aligned on inner boss 12 with channel 30 disposed in the outer surface of the inner boss as seen in FIGS. 6, 7 and 9. Channel 78 in the outer boss is positioned such that a portion thereof passes through the constant radius portion of the axial bore 54 as is seen in FIG. 11.

The locking assembly 16 of the anti-theft device 10 comprises a cylindrical lock 90 actuated by a key 92. Lock 90 is mounted in a cylindrical protective sleeve 94 within chamber 70 in the outer boss 14. As seen in FIGS. 3 and 28, the outer surface of cylindrical sleeve 94 defines a horizontal channel 96 therein and an oppositely disposed vertical channel 98. Channels 96 and 98 are adapted to receive portions of steel locating pins 100 and 102 which extend through channels 103 and 104 in the body portion 52 of outer boss 14 so as to properly align and retain the lock receiving sleeve 94 within chamber 70 in the outer boss. Interior surface of sleeve 94 is also provided with a channel 106 therein which is adapted to receive a raised rib (not shown) on the cylindrical lock 90 to properly align the lock within the protective sleeve 94. The locking bolt 108 which projects from lock 90 extends through the underside of sleeve 94 and through a lock rotation limiter 110, star washer 112 and threadably engages nut 114, thereby securing the lock 90 within sleeve 94. The extended end 116 of locking bolt 108 is keyed to the limiter thereby limiting the rotational movement of bolt 108 between the abutment of stops 110' and 110" on the limiter 110 with the side walls 111' and 111" of sleeve extension 111, thus limiting the rotation of the key 92 and bolt 106 to 180°.

Figure 12:
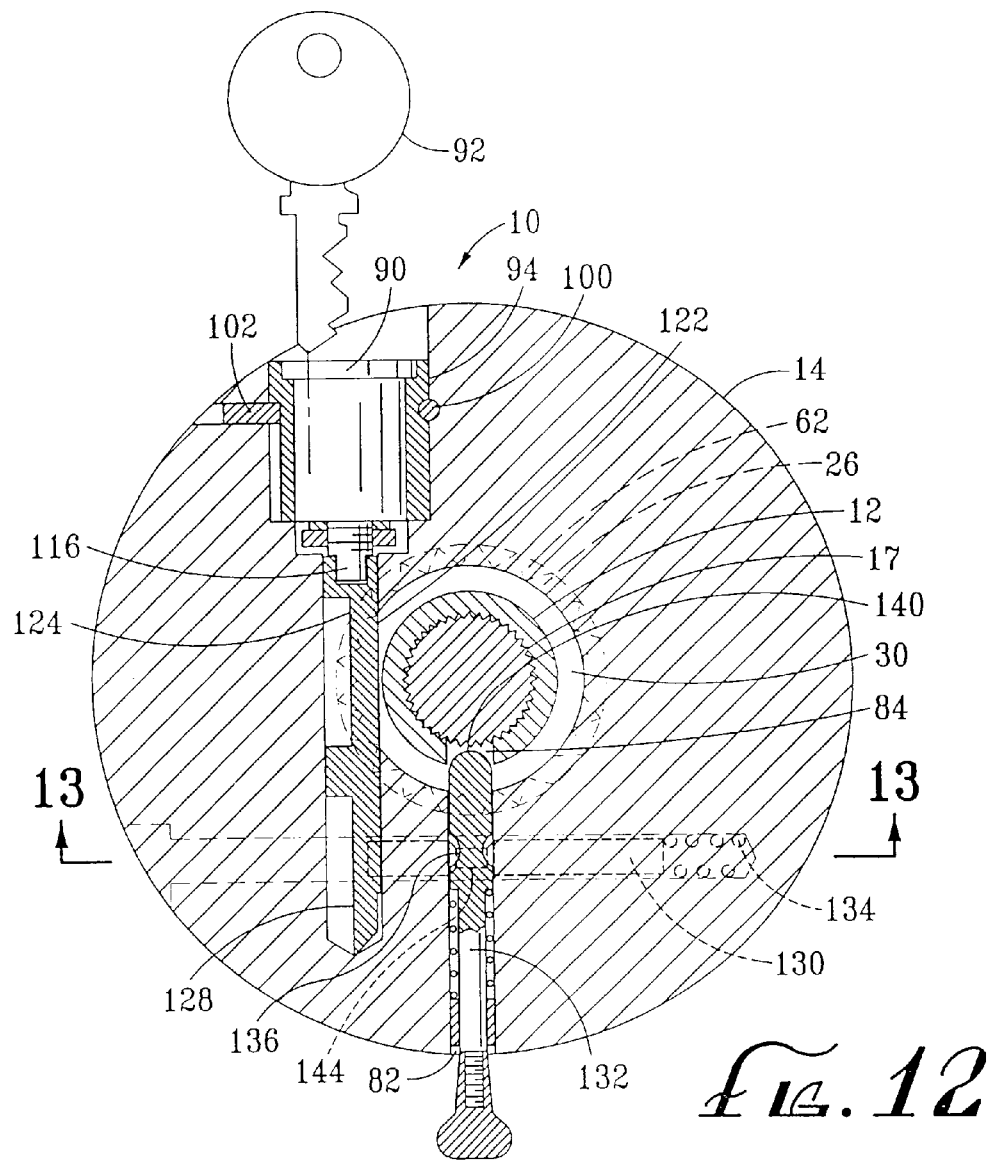
FIG. 12 is a sectional frontal view of the anti-theft device of the present invention shown fully locked in the engaged position for operation of the motor vehicle.

The end of 116 of the locking bolt 108 projects through nut 114 into a bifurcated head portion 118 of key pin 120 disposed within channel 78 in the outer boss. Key pin 120 defines an upper curvilinear cam portion 122 disposed opposite a flat portion 124, a lower curvilinear cam portion 126 disposed opposite a lower flat portion 128 (see FIGS. 3, 24 and 25). Accordingly, unrestricted 180° rotation of key 92 would effect 180° rotation of the key pin 120 within elongated channel 78. In the fully locked position, the upper cam portion 122 of key pin 120 faces and projects into the bore of the outer boss 14 as seen in FIG. 12. In the unlocked position, the central bore 54 of the outer boss is free from intrusion by key pin 120 as the upper flat portion 124 of the key pin faces but is recessed from the bore 54 of the outer boss as illustrated in FIG. 14.

Figure 13:
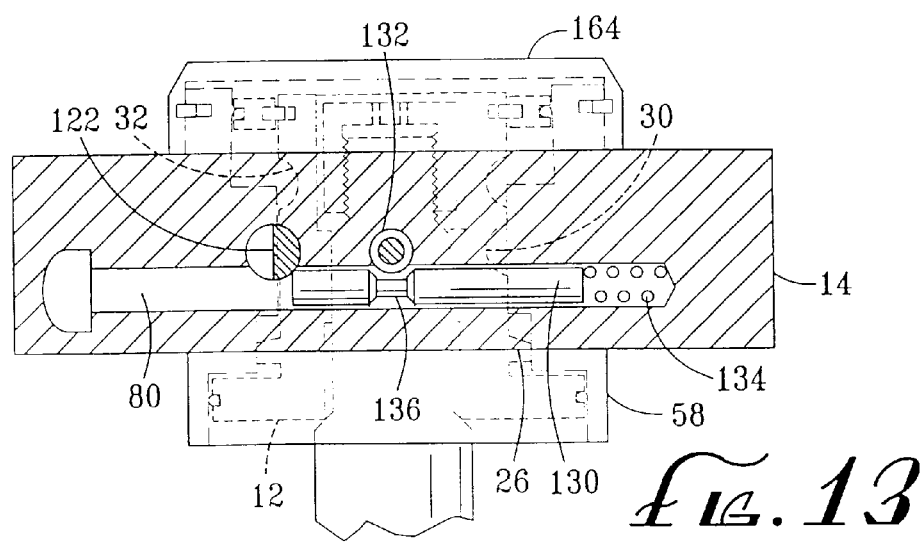
FIG. 13 is a sectional view taken along the line 13—13 in FIG. 12.

Locking assembly 16 additionally includes a plunger rod 130 and safety pin 132. Rod 130 is axially translatable within an interior portion of channel 80 in the outer boss 14 and is biased therein against either the lower cam portion 126 of key pin 120 or the lower flat portion 128 thereof by a coil spring 134 disposed in the inner most end portion of channel 80 as seen for example in FIGS. 12 and 14. Plunger rod 130 defines a reduced diameter portion 136 positioned thereon such that portion 136 is in alignment with vertical channel 82 upon the end 130' of plunger rod 130 being in abutment with the lower cam portion 126 of key pin 120, as seen in FIG. 13.

Figure 14:
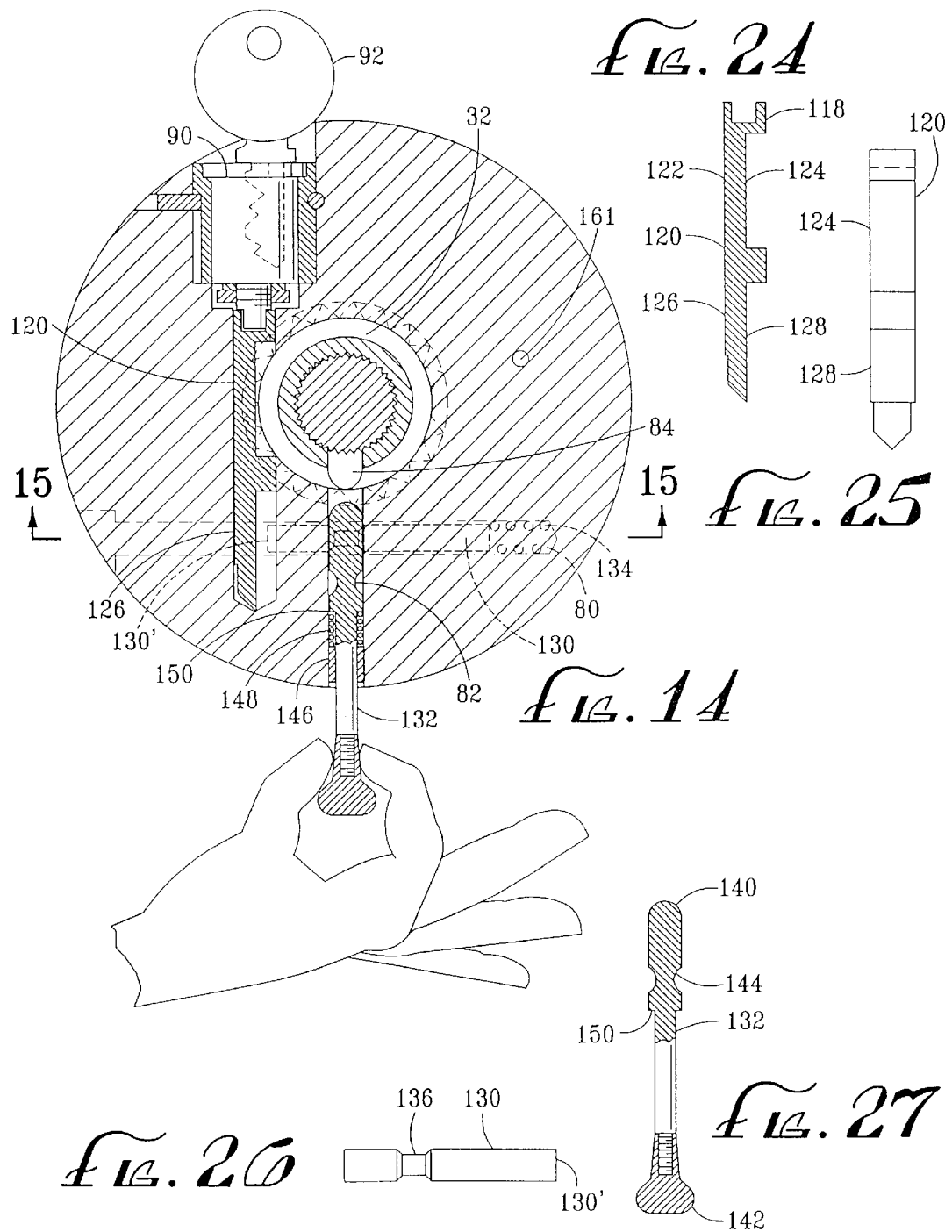
FIG. 14 is a sectional frontal view of the anti-theft device of the present invention illustrating the unlocking of the device for the disengagement of the steering wheel.
Figure 15:
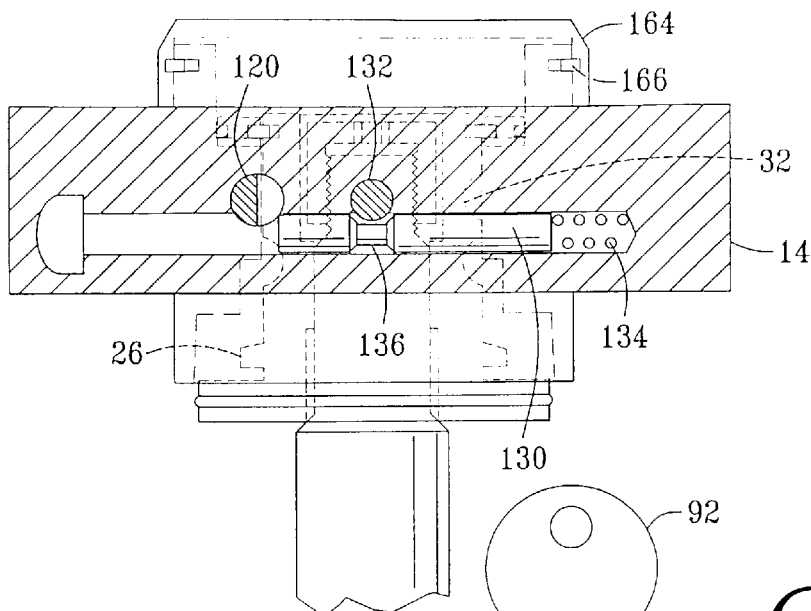
FIG. 15 is a sectional view taken along the line 15—15 in FIG. 15.

The safety pin 132 is disposed in vertical channel 82 and is axially translatable therein between a forward position illustrated in FIG. 12 and a rearward position illustrated in FIG. 14. Safety pin 132 is illustrated in FIG. 27 and defines inwardly projecting rounded nose portion 140, a handle portion 142 and a reduced diameter portion 144 proximate nose portion 140. Safety pin 132 is permanently retained in channel 82 by means of a retention sleeve 146 brazed in place within the lower outer portion of channel 82. A coil spring 148 is disposed in channel 82 about pin 132 and is compressed between and bears against the inner end of sleeve 146 and an annular stop 150 defined by safety pin 132 as seen, for example, in FIGS. 12 and 14. As will be hereinafter explained, when the safety pin is in its most forward position (see FIG. 12), the nose portion 140 thereof projects from channel 82 in the outer boss into channel 32 in the inner boss, thereby preventing relative axial movement between the inner boss 12 and the outer boss 14 and thus preventing disengagement of the steering wheel 48 from the steering column 17 even if the key 92 were inadvertently turned to the unlocked position during operation of the vehicle.

The assembly of the anti-theft device 10 and attachment of the device to the steering column 17 and steering wheel 48 is illustrated in FIGS. 2, 3 and 6–9. The inner boss 12 and outer boss 14 (with the locking assembly 16 in place therein) are first secured together by placing o-ring 24 within the recess 22 in the outer surface of annular flange 20 on the inner boss. A second o-ring 25 is disposed within a recess 27 in the outer surface of an annular steel securement ring 29. The inner boss 12 is then inserted through the axial bore 54 in the outer boss with the key pin 120 in the outer boss being in the unlocked position illustrated in FIG. 14 so the upper cam portion 122 does not interfere with the insertion of the inner boss through bore 54. With the guide key 64 in the outer boss aligned with the gap 28 in the locking teeth 26 of the inner boss, the inner boss can be fully inserted into the outer boss whereupon the locking teeth 26 on the inner boss will mate with the locking teeth 62 on the outer boss. Securement ring 29 is then secured to the forward end 35 of the inner boss by means of a split ring 31 which extends between the annular groove 34 and the end portion of the inner boss and a groove 33 disposed in the interior surface of the securement ring as seen in FIG. 9. So secured, the securement ring 29 is disposed within the forwardly projecting annular flange 56 of the outer boss and, due to the securement of ring 29 to the forward end of the inner boss, the outer boss 14 is prevented from being separated from the inner boss 12. As the outer boss 14 is pulled from the inner boss 12 without restriction from the locking assembly 16, the securement ring 29 on the forward end of the inner boss will abut annular wall 69 about the forward end of the axial bore of the outer boss.

During use, the o-rings 24 and 25 carried by the inner boss bear against the interior surfaces 58' and 56' of the rearwardly and forwardly projecting flanges 58 and 56 on the outer boss, thereby preventing vibration between the inner boss and the outer boss and foreign matter from passing between the inner and outer bosses and interfering with the mating relationship of the inner and outer bosses. The annular surfaces 58' and 56' against which the o-rings bear are preferably tapered slightly such that the o-rings are lightly compressed thereagainst as they are drawn inwardly toward abutment walls 60 and 69 respectively. An air passage 151 is provided in flange 20 on the inner boss 12 so that the sealing engagement of o-rings 24 and 25 with the interior flange surfaces 58' and 56' will not create a pressure buildup within device 10 which would inhibit axial movement of the outer boss 14 on the inner boss.

The assembled anti-theft device 10 is secured to the steering column 17 by means of the threaded fastening member 152 shown in FIG. 29. A horn connector 154 is first disposed about the steering column 17 as seen in FIGS. 2 and 3. The horn connector is molded of a plastic material and fits over the steering column 17 such that a rearwardly facing axial collar 155 thereon rests against a tapered portion 17' of the steering column. Connector 154 also defines a flat disk portion 155 against which an electrically conductive ring 156, preferably constructed of brass, is positioned. The horn connector 154 also defines a forwardly projecting sleeve 157 in which a spring biased electrical contact 158 is disposed which is in electrical communication with the conductive ring 156. Upon assembly, ring 156 is in continual electrical communication with a stationary wiper contact (not shown) which, in turn, is in electrical communication with the vehicle's horn. A second electrically conductive ring 159, also preferably constructed of brass, is positioned against a plastic insulating ring 160 disposed about the rearwardly projecting flange 58 on the rearward side 52' of the outer boss 16.

Upon sliding the assembled anti-theft device 10 fully onto the steering column 17, the splines 44 in the bore of the inner boss mate with the splined portion 46 of the steering column 17 and the above-described electrical contacts for the vehicle horn via rings 156 and 159 are established. An electrical wire (not shown) extends from ring 159 on the outer boss about the adjacent plastic ring backing 160 and through an axially disposed channel 157 in the body portion of the outer boss to a standard horn button (also not shown). By radially aligning channel 157 in the outer boss with the guide key 64 therein during manufacture and aligning the air passage 151 in the rear flange 20 on the inner boss with the guide gap 28 in the inner boss, proper alignment of the guide key 64 with gap 78 and thus outer boss 14 with the inner boss 12 during assembly is facilitated. The anti-theft device 10 is secured in place to the steering column by threadably engaging the fastening member 152 onto the threaded portion 17" of the steering column. Fastening member 152 defines an Allen wrench opening 162 in the forwardly facing surface thereof for tightening the member about the steering column.

The steering wheel 48 is connected to the outer boss by means of an adapter 160 and a plurality of threaded fastening members 163 and 165, as seen, for example, in FIG. 2. If permanent attachment of the anti-theft device 10 to the vehicle is desired, a cover 164 constructed of case hardened steel is secured about the forwardly projecting flange 56 on the outer boss 14 prior to securement of the steering wheel adapter 160. Cover 164 is secured in place by a split locking ring 166 which is positioned about flange 56 in groove 167 proximate the forward end of flange 56 and, upon sliding cover 164 thereover, expands into a groove 168 formed in the interior surface of the sidewall 169 of cover 164, thus permanently sealing access to fastening member 152 and preventing removal of the anti-theft device 10 from the steering column.

In use, the anti-theft device 10 is shown in FIGS. 12 and 13 as being fully locked in the engaged position for operation of the vehicle. As seen therein, the locking teeth 26 and 62 on the inner and outer bosses are in a mating relationship whereby any rotational movement imparted to the outer boss 14 effected by rotation of the steering wheel 48 is translated to the steering column 17 by the corresponding rotational movement of the inner boss 12. To prevent any retraction of the outer boss with respect to the inner boss and thus disengagement of the steering wheel, the upper cam portion 122 on key pin 120 projects from the outer boss in channel 78 through the rearwardly disposed annular channel 32 in the surface of the body portion of the inner boss 12. The safety pin 132 is in its fully inserted position such that it extends from the outer boss through channel 82 therein into the inner boss through the aligned aperture 84, thereby providing an additional engagement between the inner and outer bosses 12 and 14. The safety pin 132 is continuously urged into this fully inserted locking position by its associated coil spring 148.

Figure 23:
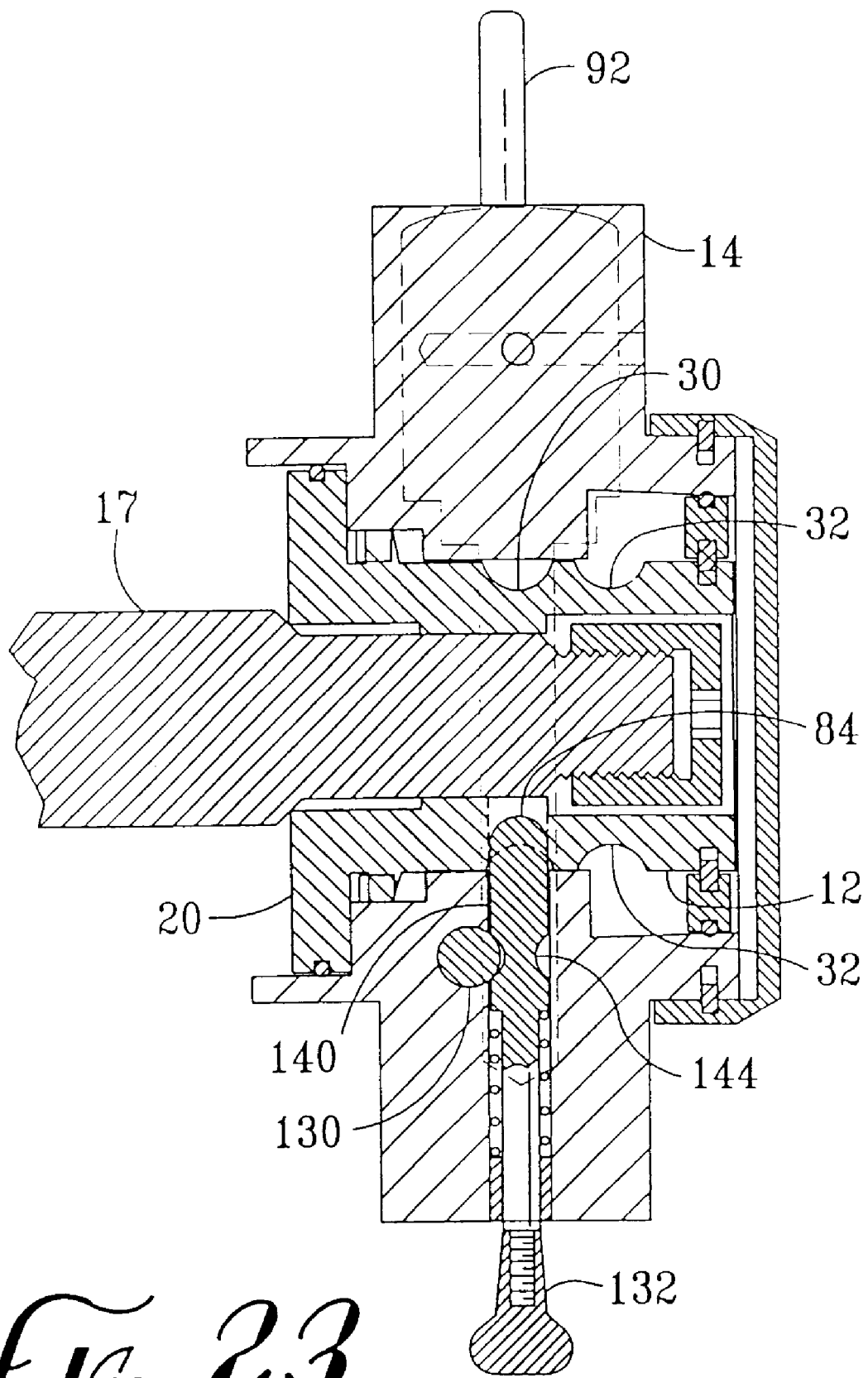
FIG. 23 is a sectional view taken along the line 23—23 in FIG. 22.

To disengage the steering wheel from the fully locked position illustrated in FIGS. 12 and 13 and render the vehicle effectively disabled, it is necessary to turn the key 92 to the unlocked position while withdrawing and holding the safety pin 132 in an extended position against coil spring 148 as illustrated in FIG. 14. Disengagement of the steering wheel requires the deliberate use of two hands and can not result inadvertently. If one were to turn key 92 to its unlocked position without first withdrawing the safety pin 132, the plunger rod 130 would lock the safety pin 132 in its fully inserted position, wherein the nose portion 140 of the safety pin projects into the inner boss, and thereby prevent any axial separation of the inner and outer bosses and disengagement of the steering wheel. This occurs as a result of the leftward movement (as viewed in FIG. 12) of the plunger rod 130 under the pressure of the coil spring 134 as the lower curvilinear cam portion 126 on key pin 120 is rotated away from the end 130' of the plunger rod 130 when the key pin is rotated by the key 92 to the unlocked position. As the plunger rod 130 is moved against the lower flat portion 128 of key pin 120, the reduced diameter portion 136 of the plunger moves out of alignment with the safety pin 132 such that the adjacent larger diameter portion of the plunger rod 130 is disposed across the reduced diameter portion 144 of the safety pin, blocking withdrawal of the safety pin. Such a position is illustrated in FIGS. 22 and 23.

If the key 92 is turned to the unlocked position while the safety pin 130 is held in the withdrawn position, the dual coupling of the outer boss 14 to the inner boss 12 afforded by the upper cam portion 122 of locking pin 120 and the latching action of safety pin 132 is removed and the outer boss can be axially disengaged from the inner boss. This is achieved by the driver pulling the steering wheel 48 toward himself or herself while the safety pin 130 continues to be held in the retracted position, axially separating the previously mating locking teeth 26 and 62 on the two bosses. The steering wheel is then in a freewheeling position and can not control the vehicle. The disengaging of the steering wheel is shown in FIG. 14.

Figure 16:
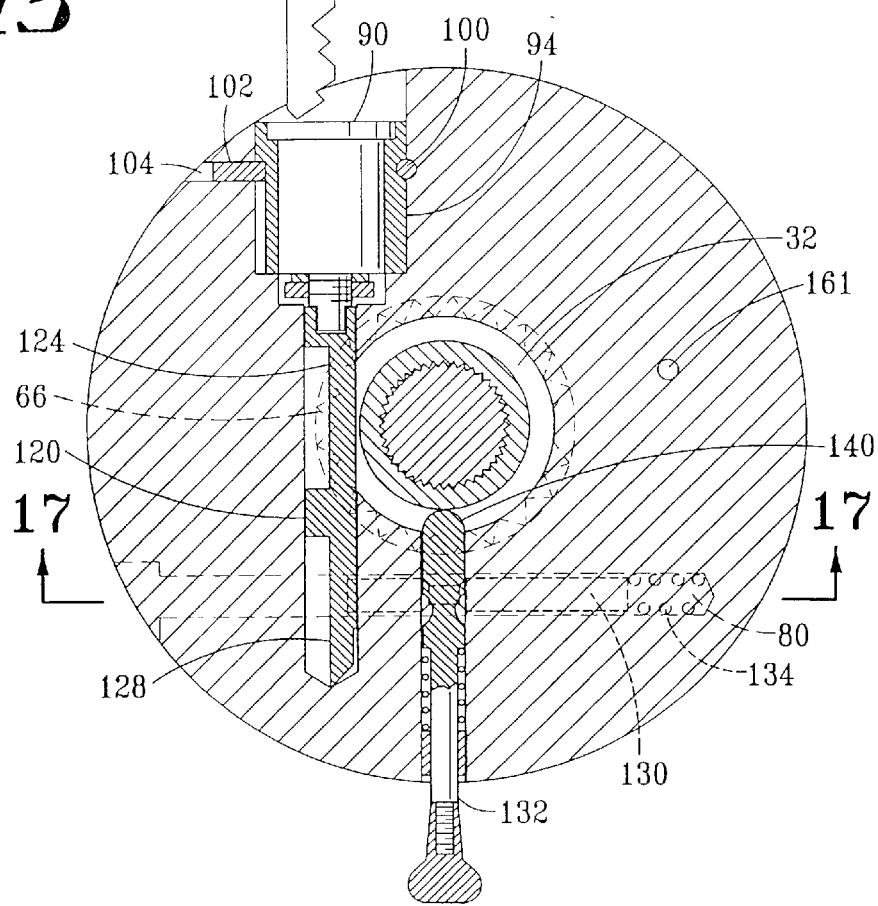
FIG. 16 is a sectional frontal view of the anti-theft device of the present invention shown fully locked in the disengaged position.

The extent to which the steering wheel can actually be moved forwardly toward the driver is limited by the spacing between the securement ring 29 carried by the forward end 35 of the inner boss 12 and the annular wall 69 adjacent the forward end of the axial bore 54 in the outer boss 14. As the driver of the vehicle pulls the steering wheel to the disengaged position, the inner boss is held in place by its securement to the steering column 17 and the outer boss is pulled forwardly until wall 69 abuts the securement ring 29. As the outer boss is pulled forwardly relative to the inner boss, the central axes of the key pin 120 and safety pin 132, which were previously in planar alignment with the rearwardly disposed annular channel 30 in the surface of the inner boss, are brought into alignment with the forward channel 32 in the inner boss. Thus, subsequent rotation of key 92 and the corresponding rotation of key pin 120 causes the upper cam portion 122 of the key pin to be disposed within the forward channel 32 in the inner boss, securing the device 10 in the disengaged position. The nose portion 140 of the safety pin 132 concurrently projects from the outer boss into channel 32 in the inner boss as seen in FIGS. 16 and 17. The anti-theft device 10 is now fully locked in the disengaged position. The steering wheel is freewheeling and the vehicle is effectively disabled.

FIG. 18 illustrates the anti-theft device 10 in the disengaged freewheeling position and differs from the orientation of FIG. 16 in that the key 92 has been turned to the unlocked position to initiate re-engagement of the steering wheel. In this position, the safety pin 132 is still seated in the forward channel 32 in the inner boss and the plunger rod 130 is held in place within channel 82 due to the interference created by the larger diameter portion of the safety pin as seen in FIG. 19. Having turned the key to the unlocked position, the driver then applies pressure on the steering wheel while turning the steering wheel so as to align the guide key 64 adjacent the locking teeth 62 on the outer boss with the gap 28 in the locking teeth 26 on the inner boss. If desired, a variety of different indicia could be provided to assist in such alignment.

FIGS. 20 and 21 illustrate the relative positioning of the components of the anti-theft device 10 as the steering wheel has been properly aligned and the locking teeth on the outer boss are being pushed axially into engagement with the locking teeth on the inner boss. The nose portion 140 of the safety pin is shown riding on the ridge 33 between channels 30 and 32 in the inner boss and the plunging rod 130 is still held in a depressed disposition by the safety pin 138. The nose portion 140 of safety pin 38 is rounded so that the pin can slide readily between the forward and rearward channels 32 and 30 in the body of the inner boss.

FIGS. 22 and 23 illustrate the relative positioning of the components upon the locking teeth on the inner and outer bosses. being fully engaged for steering the vehicle and the safety pin 132 having been returned to its fully inserted locking position within the radial channel 84 in inner boss by the coil spring 148. Coil spring 134 has moved the plunger rod 130 against the lower flat portion 128 of key pin 120 as the reduced diameter portion 144 of the safety pin is again aligned with channel 80 and plunger rod 130. Thus, even though the key 92 remains in the unlocked position, the inner and outer bosses are held in the locked position by the safety pin 132. Rotation of the key 120 to the locked position completes the securement of the steering wheel to the steering column with the anti-theft device 10 in the fully locked position illustrated in FIGS. 12 and 13.

To prevent one from inadvertently attempting to drive the vehicle with the steering wheel in such a condition, an ignition inhibitor switch (not shown) can be provided in the inner boss which opens the electrical circuit through the vehicle ignition switch when the locking mechanism is in the unlocked position. Such a mechanism could be very similar to that which prevents automobiles provided with automatic transmissions from being started with the gear shift in drive. Alternatively, a warning cover could be provided which is placed about the steering wheel or a portion thereof when the anti-theft device 10 is in the disengaged mode. The use of such a cover would not only give notice to the driver of the disengaged state of the steering wheel, it also gives notice to a potential thief of the presence of device 10 which could deter forced entry into the vehicle in the first instance and thus prevent any consequential damage to the door locks.

Various changes and modification may be made in carrying out the present invention without departing from the spirit and scope thereof. Insofar as these changes and modifications are within the purview of the appended claims, they are to be considered as part of the present invention.

We claim:

1. An anti-theft device from motor vehicles which selectively disables the vehicle by interrupting the operative connection of a steering wheel to a steering column, said device comprising: a first boss adapted to be fixed to the steering wheel; a second boss adapted to be fixed to the steering column, said first boss being mounted on and axially translatable with respect to said second boss between a first position wherein said first boss engages said second boss and a second position wherein said first boss is rotatable on and with respect to said second boss; and a locking assembly carried by said first boss and selectively securing said first boss in one of said first and second positions, said locking assembly comprising a key actuated first locking member movable between a locked position and an unlocked position, said first locking member selectively securing said first boss in one of said first and second positions when said member is in said locked position, and a second locking member translatable between an extended position and a retracted position, said second locking member engaging said first boss in said extended position and securing said first boss in said first position thereby providing a dual locking of said first boss in said first position and, upon said first locking member being moved to said unlocked position and said locking member being moved to said retracted position, said first boss is axially translatable to said second position for disabling the vehicle.

2. The device of claim 1 wherein said first boss defines a first plurality of radially projecting locking teeth and said second boss defines a second plurality of radially projecting locking teeth, said first plurality of teeth mating with said second plurality of teeth in said first position and being axially displaced from said second plurality of teeth in said second position.

3. An anti-theft device from motor vehicles which selectively disables the vehicle by interrupting the operative connection of a steering wheel to a steering column, said device comprising: a first boss adapted to be fixed to the steering wheel; a second boss adapted to be fixed to the steering column, said first boss being mounted on and axially translatable with respect to said second boss between a first position wherein said first boss engages said second boss and a second position wherein said first boss is rotatable on and with respect to said second boss; and a locking assembly carried by said first boss and selectively securing said first boss in one of said first and second positions, said locking assembly comprising a key actuated first locking member rotatable between a locked position wherein said member secures said first boss in one of said first and second positions and an unlocked position, a second locking member translatable between an extended position wherein said second locking member secures said first boss in said first position and a retracted position, and a third locking member translatable in response to rotation of said first locking member, said third locking member engaging and maintaining said second locking member in said extended position when said first locking member is in said unlocked position, whereby the operative connection of the steering wheel is maintained when said first locking member is rotated to the unlocked position with the second locking member in said extended position.

4. The device of claim 3 including a first spring member biasing said second locking member toward said extended position and a second spring member biasing said third locking member toward said first locking member, said first locking member defining a cam surface thereon, said cam surface cooperating with said second spring member to move said third locking member within said first boss.

5. The device of claim 3 wherein said second and third locking members each define reduced diameter portions thereon, said second locking member being movable between said extended and retracted positions upon the reduced diameter portion of said third locking member being axially aligned with said second locking member and, upon said reduced diameter portion of said third locking member being moved out of said alignment with said second locking member, said second locking member is maintained in said extended position by said third locking member.

6. The device of claim 3 wherein said first boss defines a first plurality of radially projecting locking teeth and said second boss defines a second plurality of radially projecting locking teeth, said first plurality of teeth mating with said second plurality of teeth in said first position and being axially displaced from said second plurality of teeth in said second position.

7. The device of claim 3 wherein said second and third locking members each define reduced diameter portions thereon, said second locking member being movable between said extended and retracted positions upon the reduced diameter portion of said third locking member being axially aligned with said second locking member and, upon said reduced diameter portion of said third locking member being moved out of said alignment with said second locking member, said second locking member is maintained in said extended position by said third locking member, and wherein the reduced diameter portion of said second locking member is in axial alignment with said third locking member when said second locking member is in said extended position to allow said third locking member to be moved by said second spring member against said first locking member whereupon said reduced diameter portion of said third locking member is out of axial alignment with said second locking member, maintaining said second locking member in the extended position.

8. The device of claim 5 wherein said first boss defines a first plurality of radially projecting locking teeth and said second boss defines a second plurality of radially projecting locking teeth, said first plurality of teeth mating with said second plurality of teeth in said first position and being axially displaced from said second plurality of teeth in said second position.

9. An anti-theft device for motor vehicles which selectively disables the vehicle by interrupting the operative connection of a steering wheel to a steering column, said device comprising: an outer boss adapted to be fixed to the steering wheel and defining a first plurality of radially projecting locking teeth thereon; an inner boss adapted to be fixed to the steering column and defining a second plurality of locking teeth thereon, said outer boss being mounted on and axially translatable with respect to said inner boss between a first position wherein said plurality of teeth on said outer boss engage said plurality of teeth on said inner boss and a second position wherein said first plurality of teeth are axially spaced from said second plurality of teeth and said outer boss is rotatable on and with respect to said inner boss; and a locking assembly carried by said outer boss for selectively securing said outer boss in one of said first and second positions, said locking assembly comprising a key actuated first locking member movable between a locked position and an unlocked position, said first locking member selectively securing said outer boss in one of said first and second positions when said member is in said locked position, and a second locking member translatable between an extended position and a retracted position, said second locking member engaging said inner boss in said extended position and securing said outer boss in said first position thereby providing a dual locking of said outer boss in said first position, and wherein said second locking member is operatively connected to said first locking member such that said second locking member is maintained in engagement with said inner boss preventing disengagement of said outer boss with said inner boss upon said first locking member being moved to said unlocked position with said second locking member in said extended position thereby preventing inadvertent disengagement of the steering wheel.

10. An anti-theft device for motor vehicles which selectively disables the vehicle by interrupting the operative connection of a steering wheel to a steering column, said device comprising: an outer boss adapted to be fixed to the steering wheel; an inner boss adapted to be fixed to the steering column, said outer boss being mounted on and axially translatable with respect to said inner boss between a first position wherein said outer boss engages said inner boss and a second position wherein said outer boss is rotatable on and with respect to said inner boss; and a locking assembly carried by said outer boss for selectively securing said outer boss in one of said first and second positions, said locking assembly comprising a first locking member movable between a locked position and an unlocked position, in said locked position said first locking member securing said outer boss in one of said first and second positions, and a second locking member operatively connected to said first locking member and movable between an extended position and a retracted position, in said extended position said second locking member engaging said outer boss and securing said outer boss in said first position and thereby providing a dual locking of said outer boss in said first position, and upon being moved to said retracted position, said second locking member allowing said first locking member to be moved to said unlocked position and said outer boss to said second position for disabling the vehicle.

11. An anti-theft device for motor vehicles which selectively disables the vehicle by interrupting the operative connection of a steering wheel to a steering column, said device comprising: an outer boss adapted to be fixed to the steering wheel and defining a first plurality of radially projecting locking teeth thereon; an inner boss adapted to be fixed to the steering column and defining a second plurality of locking teeth thereon, said outer boss being mounted on and axially translatable with respect to said inner boss between a first position wherein said plurality of teeth on said outer boss engage said plurality of teeth on said inner boss and a second position wherein said first plurality of teeth are axially spaced from said second plurality of teeth and said outer boss is rotatable on and with respect to said inner boss; and a locking assembly carried by said outer boss for selectively securing said outer boss in one of said first and second positions, said locking assembly comprising a first locking member movable between a locked position and an unlocked position, in said locked position said first locking member securing said outer boss in one of said first and second positions, and a second locking member operatively connected to said first locking member for engaging said outer boss and securing said outer boss in said first position and thereby providing a dual locking of said outer boss in said first position and, alternatively, allowing said first locking member to be moved to said unlocked position and said outer boss to said second position for disabling the vehicle.

12. An anti-theft device for motor vehicles which selectively disables the vehicle by interrupting the operative connection of a steering wheel to a steering column, said device comprising: an outer boss adapted to be fixed to the steering wheel; an inner boss adapted to be fixed to the steering column, said outer boss being mounted on and axially translatable with respect to said inner boss between a first position wherein said outer boss engages said inner boss and a second position wherein said outer boss is rotatable on and with respect to said inner boss; and a locking assembly carried by said outer boss for selectively securing said outer boss in one of said first and second positions, said locking assembly comprising a key actuated first locking member rotatable between a locked position and an unlocked position, in said locked position said first locking member securing said outer boss in one of said first and second positions, a second locking member translatable between an extended position and a retracted position, in said extended position said second locking member securing said outer boss in said first position, a spring member for biasing said second locking member toward said extended position and wherein said second locking member is operatively connected to said first locking member such that said second locking member is maintained in said extended position when said first locking member is in said unlocked position and is movable between said extended and retracted positions when said first locking member is in said locked position whereby the operative connection of the steering wheel to the steering column is maintained by said second locking member upon said first locking member being rotated to the unlocked position with said second locking member in the extended position, and a third locking member extending between said first locking member and said second locking member, said third locking member providing the operative connection between said first and second locking members.

13. The device of claim 12 wherein said outer boss defines a first plurality of radially projecting locking teeth and said inner boss defines a second plurality of radially projecting locking teeth, said first plurality of teeth mating with said second plurality of teeth in said first position to operatively connect the steering wheel to the steering column and being axially displaced from said second plurality of teeth in said second position to interrupt said operative connection.

14. The device of claim 12 wherein said outer boss defines a first plurality of radially projecting locking teeth and said inner boss defines a second plurality of radially projecting locking teeth, said first plurality of teeth mating with said second plurality of teeth in said first position to operatively connect the steering wheel to the steering column and being axially displaced from said second plurality of teeth in said second position to interrupt said operative connection.

15. The device of claim 12 wherein said first locking member defines a cam surface thereon, said cam surface cooperating with said second spring member to move said third locking member relative to said first and second locking members.

16. The device of claim 15 wherein said second and third locking members each define reduced diameter portions thereon, said second locking member being movable between said extended and retracted positions upon the reduced diameter portion of said third locking member being axially aligned with said second locking member and, upon said reduced diameter portion of said third locking member being moved out of said alignment with said second locking member, said second locking member is maintained in said extended position by said third locking member.

17. The device of claim 15 wherein said second and third locking members each define reduced diameter portions thereon, said second locking member being movable between said extended and retracted positions upon the reduced diameter portion of said third locking member being axially aligned with said second locking member and, upon said reduced diameter portion of said third locking member being moved out of said alignment with said second locking member, said second locking member is maintained in said extended position by said third locking member, and wherein the reduced diameter portion of said second locking member is in axial alignment with said third locking member when said second locking member is in said extended position to allow said third locking member to be moved by said second spring member against said first locking member whereupon said reduced diameter portion of said third locking member is out of axial alignment with said second locking member, maintaining said second locking member in the extended position.

* * * * *